March 20, 1956 — O. H. DICKE — 2,738,642
TIME SYSTEM

Filed June 29, 1949 — 3 Sheets-Sheet 1

INVENTOR
Oscar H. Dicke
BY
John B. Sponsler
AGENT

March 20, 1956  O. H. DICKE  2,738,642
TIME SYSTEM
Filed June 29, 1949  3 Sheets-Sheet 2

INVENTOR
Oscar H. Dicke
BY
John B. Sponsler
AGENT

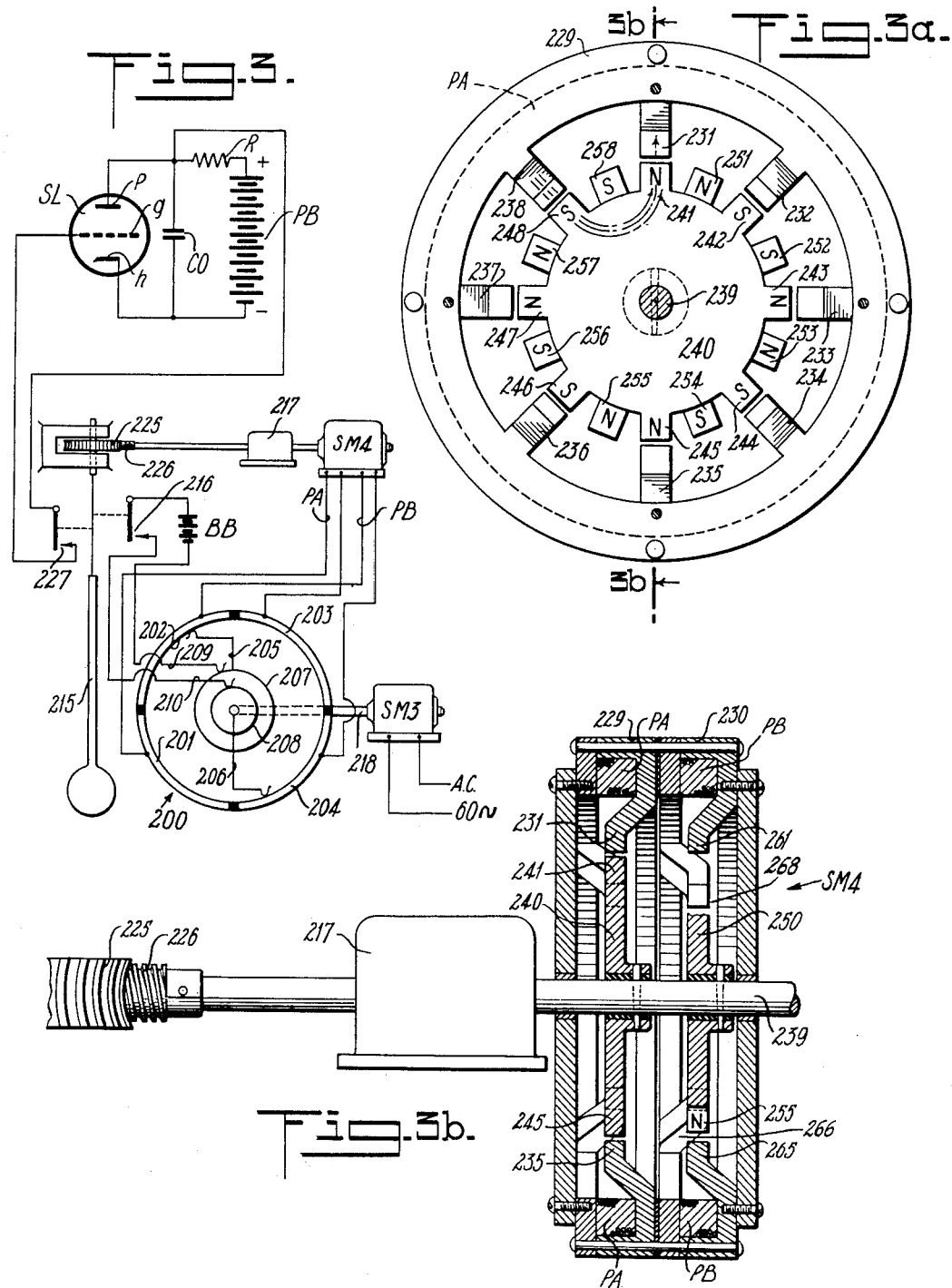

United States Patent Office 2,738,642
Patented Mar. 20, 1956

2,738,642

TIME SYSTEM

Oscar H. Dicke, New Bremen, Ohio

Application June 29, 1949, Serial No. 101,934

10 Claims. (Cl. 58—24)

This invention relates to time measuring apparatus and more particularly to apparatus for measuring the passing of time accurately as determined in accordance with the average frequency of a commercial alternating current power system of varying frequency so regulated that its average frequency correctly manifests the passing of time.

Commercial alternating current power systems are primarily provided to furnish power in varying quantity to its consumers. Since, due to large motors and the like, drawing power in varying quantity from the system the total load varies continually and for this reason it is necessary for the prime movers to be supplied with varying power input. This varying power input is determined in accordance with a speed governor and therefore in accordance with the speed of the prime mover itself and therefore in accordance with the frequency of the power system. The frequency must therefore vary in order that the necessary varying amounts of power may be generated. Commercial power systems are however further regulated so that the total number of cycles generated in each day is substantially such that the average cycles per second is the system frequency, such as 50 or 25 cycles per second. In other words, the frequency is variable and is so regulated that the average frequency correctly manifests the passing of time.

In accordance with the present invention it is proposed to construct time manifesting apparatus which operates at a constant speed and to provide means for automatically adjusting its speed of operation or its time period measuring characteristic in accordance with the average frequency of such commercial alternating current power system.

One object of the invention is to provide time measuring apparatus, the speed of operation of which may be adjusted, and to provide means including a synchronous motor operated by power from the commercial alternating current power system and to provide means responsive to the difference between the speed of the synchronous motor and the speed of the time measuring apparatus and to employ this difference to adjust the speed of operation of the time measuring apparatus.

Another object of the invention resides in the provision of oscillatory means for measuring equal time intervals which if integrated continuously measure accurately the passing of time.

Another object of the present invention proposes the employment of an electron-tube oscillator for the purpose of generating an alternating current of constant frequency together with means for adjusting the frequency so generated automatically in accordance with the average frequency of a commercial alternating current source which at its point of generation is so regulated that its average frequency correctly manifests the passing of time.

Another object of the present invention resides in the provision of a crystal frequency controlled oscillator for accurately measuring the passing of time by generating unvarying frequency current flow of high frequency and including frequency dividing means for reducing the frequency low enough to operate a rotary synchronous motor and in the provision of adjusting means to adjust the frequency generated by the oscillator and to provide means responsive to the ratio between the reduced frequency and the frequency of the commercial power system to control the adjusting means to cause the reduced frequency to be equal or proportional to the average frequency of the commercial alternating current source.

Another object of the present invention resides in the provision of means to compare the frequency of a series of long spaced impulses with the frequency of a commercial alternating current for accurately determining the number of cycles and fraction thereof of the commercial alternating current shall transpire for the time period between two spaced impulses and to provide means for adjusting the spacing of the impulses until the period of spacing is such that the impulse frequency has a definite ratio to the average commercial frequency.

Another object of the present invention is to so construct the apparatus that a temporary cessation of the commercial alternating current will not in any way prevent proper automatic adjustment or interference with the adjustment of the regulating feature of the time measuring apparatus.

Another object of the present invention resides in the provision of a stroboscope lamp which is flashed, that is lighted, periodically at equal time intervals irrespective of the variation of the frequency of the commercial alternative current and controlled by the time measuring apparatus proposed above for the purpoe of synchronizing the balance wheel of a watch by the stroboscope principle.

Another object of the present invention proposes the construction of a poly-phase synchronous motor which is not only self-starting but is capable of starting from stand-still to full synchronous speed in less than the time period of one cycle of alternating current of 60 cycle frequency and which may also be used as an electromagnetic step-by-step mechanism.

Other objects, purposes and characteristic features of the invention will be pointed out in the accompanying specification when considered in the light of the accompanying drawings, in which:

Fig. 3 shows a still different form of the invention in which time measuring apparatus is used which does not include a rotatable shaft so that the usual mechanical differential cannot be used and in which the time measuring apparatus is automatically adjusted by electromagnetic differential means;

Fig. 3a shows a side elevation of the novel form of polyphase motor SM4 shown conventionally in Fig. 3; and Fig. 3b illustrates the novel form of poly-phase synchronous motor SM4 in a sectional elevation taken on line 3b—3b of Fig. 3a as viewed in the direction of the arrows.

Figure 1:
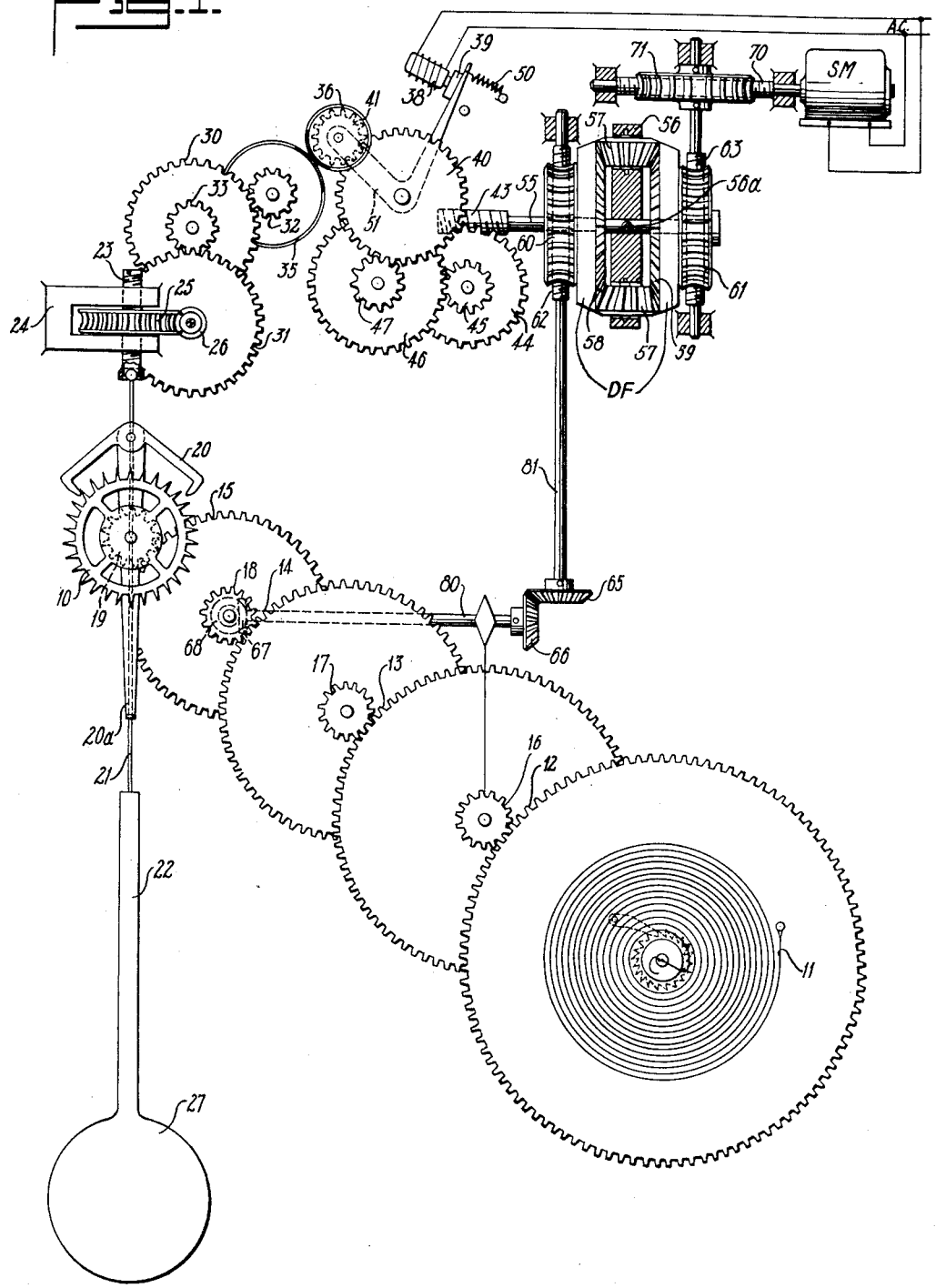
Fig. 1 shows one embodiment of the invention in which time measuring apparatus of the escapement type is automatically regulated in accordance with the present invention and in accordance with the average frequency of a commercial alternating current source.

*Fig. 1 Structure*

In the construction illustrated in Fig. 1 of the drawings an escapement wheel 10 is driven by a main spring 11 through the medium of a gear reduction train including gears 12, 13, 14 and 15 and pinions 16, 17, 18 and 19. A forked pallet 20 engages the teeth of the escapement wheel 10 secured to pinion 19 and this pallet is provided with an extending arm 20a leaving a loop through which a leaf spring 21, supported by a preferably square threaded shank 23 supported in the threaded hole of a worm-wheel 25, passes. By this construction, since the worm-wheel is supported in a fixed support 24, rotation of the worm-wheel 25 in one direction effectively shortens the pendulum comprising leaf spring 21, pendulum arm 22 and pendulum bob 27, and if rotated in the opposite direction lengthens this pendulum. The worm-wheel 25 and its associated worm 26 are driven by the planet-carrying wheel or ring 56 of a differential DF through the medium of a gear reduction train and a disengageable friction clutch. This reduction gear-train may be of any suitable construction as may also the friction clutch. In the particular construction shown the gear-train includes a worm 26 engaging the teeth of the worm wheel 25, gears 31, 30, 40 and 46, pinions 33, 32, 41, 47 and 45 and worm wheel 44, driven by worm 43 cut into shaft 55 and pinned or otherwise secured to planet-carrying wheel 56 as by a pin 56A. The friction clutch, as illustrated, although it may be of any suitable construction, preferably comprises a friction disk 36 secured to pinion 41 and a friction disk 35 secured to pinion 32. The friction disk 36 and pinion 41 are pivotally supported by a spider 51 which is pivotally supported concentrically with the gear 40. As this spider is moved about its pivotal support the friction wheel 36 may be moved into or out of frictional engagement with the friction wheel 35. The friction wheel 36 is under power-failure conditions moved out of engagement with the disk 35 by the spring 50 but when commercial alternating current power is available the electromagnet 38 attracts the armature 39 secured to spider 51 against the tension of this spring 50 to thereby cause engagement of disk 36 with disk 35 and into driving relationship. As illustrated the electromagnet 38 is connected to the source of commercial alternating current which operates the synchronous motor SM but if desired the electromagnet 38 may be operated by direct current from a rectifier which derives its current from this alternating current source. In either case the electromagnet will be deenergized when a power failure or current cessation occurs.

The differential DF includes the planet-carrying wheel 56 carrying two or more planet bevel pinions 57. These planet pinions 57 each engage both of bevel gears 58 and 59. The bevel gear 58 is secured to worm-wheel 60 both of which are pivotally supported on shaft 55 and likewise bevel gear 59 is secured to worm-wheel 61 and both of which are pivotally supported by this same shaft 55. It is thus seen that if worm-wheel 60 is rotated in one direction and worm-wheel 61 is rotated in the other the planet-carrying wheel 56 will rotate at the difference of the speeds of rotation of worm-wheels 58 and 59. Also if these worm wheels 58 and 59 rotate at the same speed the planet-carrying wheel 56 will remain stationary. To the pinion 18 of the escapement clock gear train is secured a bevel pinion 68 which is in engagement with the bevel pinion 67 secured to shaft 80. This shaft 80 also supports a bevel pinion 66 which operatively engages bevel pinion 65 supported by shaft 81 into which is cut a worm 62 engaging the teeth of the worm-wheel 60. It is thus seen that the gear train of the escapement clock drives the bevel gear 58. Any other suitable means than that shown may be provided to drive bevel gear 58 by the gear train of the escapement clock. In a similar manner the bevel gear 59 is driven in the opposite direction from that of gear 58 by the synchronous motor SM through the medium of worm-wheels 61 and 71 and worms 63 and 70, worm 70 being cut into the shaft of synchronous motor SM.

The escapement clock, when adjusted to keep correct time, as defined by the average frequency of the commercial alternating current source, will drive the bevel gear 58 in one direction each minute as many degrees as will the bevel gear 59 be driven in the opposite direction for each 3600 cycles of alternating current flow, assuming a 60 cycle source. In other words, if the escapement clock is thus fully adjusted the planet-carrying wheel 56 will remain stationary so long as the alternating current frequency is of average value. The above discussion assumes that the commercial alternating current is a 60 cycle source, for other frequency commercial sources corresponding changes in gear ratio will be necessary. No specific gear ratio between the escapement clock and bevel gear 58 and between the synchronous motor SM and the bevel gear 59 is required. All that is necessary is that these two bevel gears rotate at the same speed and in opposite directions when the clock is adjusted to keep correct time and the frequency of the regulated alternating current is of average frequency.

No specific gear ratio between ring gear or planet supporting wheel 56 and worm-wheel 25 is recommended in that the screw pitch of the square bolt 23 and the length of the pendulum 22 are factors. It may however be stated that since correction of the pendulum shall be made very slowly, because it is to correct it to the average frequency of the commercial alternating current and shall not correct the pendulum length so quickly as to follow variations in the frequency the sum total of gear reduction between differential DF and worm-wheel 25 must be very high. In fact, if one considers one twelfth second per hour a tolerable error, a clock that at the start gains or loses one minute per day or about 2½ seconds per hour will be corrected in 5 days to an extent to only gain or lose this tolerable amount (1/12 second per hour) if a gear ratio between differential DF and worm-wheel 25 is used that makes a fifty percent correction in 24 hours. Such a gear ratio will cause the clock to gain or lose only one-half minute per day at the end of the first day, one-fourth minute per day at the end of the second day, seven and one-half seconds per day at the end of the third day, three and three-fourth seconds per day at the end of the fourth day and one and seven-eighths seconds per day at the end of the fifth day which is equal to approximately one-twelfth second per hour. The clock would by the employment of the assumed gear ratio in practicing the invention gain or lose only one twelfth second per hour after five days of automatic adjustment has taken place. By the employment of this gear ratio very little adjustment of the pendulum will take place in response to ordinary variation in the commercial frequency. This assumes that the average alternating current frequency is exactly correct, presumably 60 cycles. Since the alternating current frequency of a regulated source, although it varies, does not accumulate any error, to speak of, it is readily seen that by using such slow correcting structure the escapement clock will eventually be adjusted to the average frequency. It is however believed that the above gear ratio is still too small and this will be discussed further when the operation of the structure is described.

*Operation Fig. 1.*—In view of the discussion already given above it would seem that a description of the operation of the system would be unnecessary. It may however be pointed out that when both, the escapement clock keeps and the synchronous motor manifests, correct time, that the worm wheels 60 and 61 will rotate in opposite directions at exactly the same speed and the ring 56 will not rotate at all as will also not the train of reduction gears and friction wheels between differential DF and worm-wheel 25, and no adjustment of the effective length of the pendulum 22 will take place. If now the above assumed gear ratio is used and the frequency of the alternating current is 1% high for a period of, say 15 minutes, the cycle accumulation itself will be off only 9 seconds or 36 seconds per hour, the adjustment of the escapement clock will be off only to the extent of about 36/24 or 1½ seconds per hour and if it is then slow to the same extent for the same period of time the clock is again correctly adjusted. When a power failure or current cessation occurs the synchronous motor SM will stop and the electro-magnet 38 will be de-energized to disengage the friction wheels 35 and 36 from each other so that no adjustment takes place during a current cessation. Upon the return of power the adjustment of the pendulum is the same as it was before the current cessation took place.

In connection with the above assumed gear ratio it was assumed that a 50% correction of adjustment of the pendulum would be made in 24 hours. It is believed that the gear reduction should be much greater. It should possibly be two times as great, so that a half correction would be made in 48 hours. It is believed that this would be a better gear ratio to choose, in that less change in the adjustment of the pendulum would take place during temporary variation of the alternating current frequency. If for instance, when this latter gear ratio is employed and the frequency of the alternating current is 1% high for a period of, say, 15 minutes the pendulum adjustment is off only to an extent of about three fourths of a second per hour.

Instead of employing the differential DF shown, an epicyclic gear train of any suitable construction or a planetary reduction gear train such as shown in Fig. 1 of my application Ser. No. 555,110 filed September 21, 1944, now Patent Number 2,558,935, granted July 3, 1951, may be used, in which event however the synchronous motor would run in the opposite direction than shown in said Fig. 1 of Ser. No. 555,110, so that if both the escapement wheel 145 and the synchronous motor SM operate at the correct speed the shaft 142' would remain stationary. Also, if desired, the motor supported housing structure of Fig. 3 of said application Ser. No. 555,110 may be used in place of the differential DF.

In practicing the invention of Fig. 1 it may even be desirable to make the gear reduction between shaft 55 and worm-gear 25 so great that a half correction of the pendulum error adjustment will take place in 72 hours, in that in this case practically no change in adjustment due to frequency variation of the commercial alternating current would take place and the escapement clock would at all times keep substantially perfect time.

Figure 2:
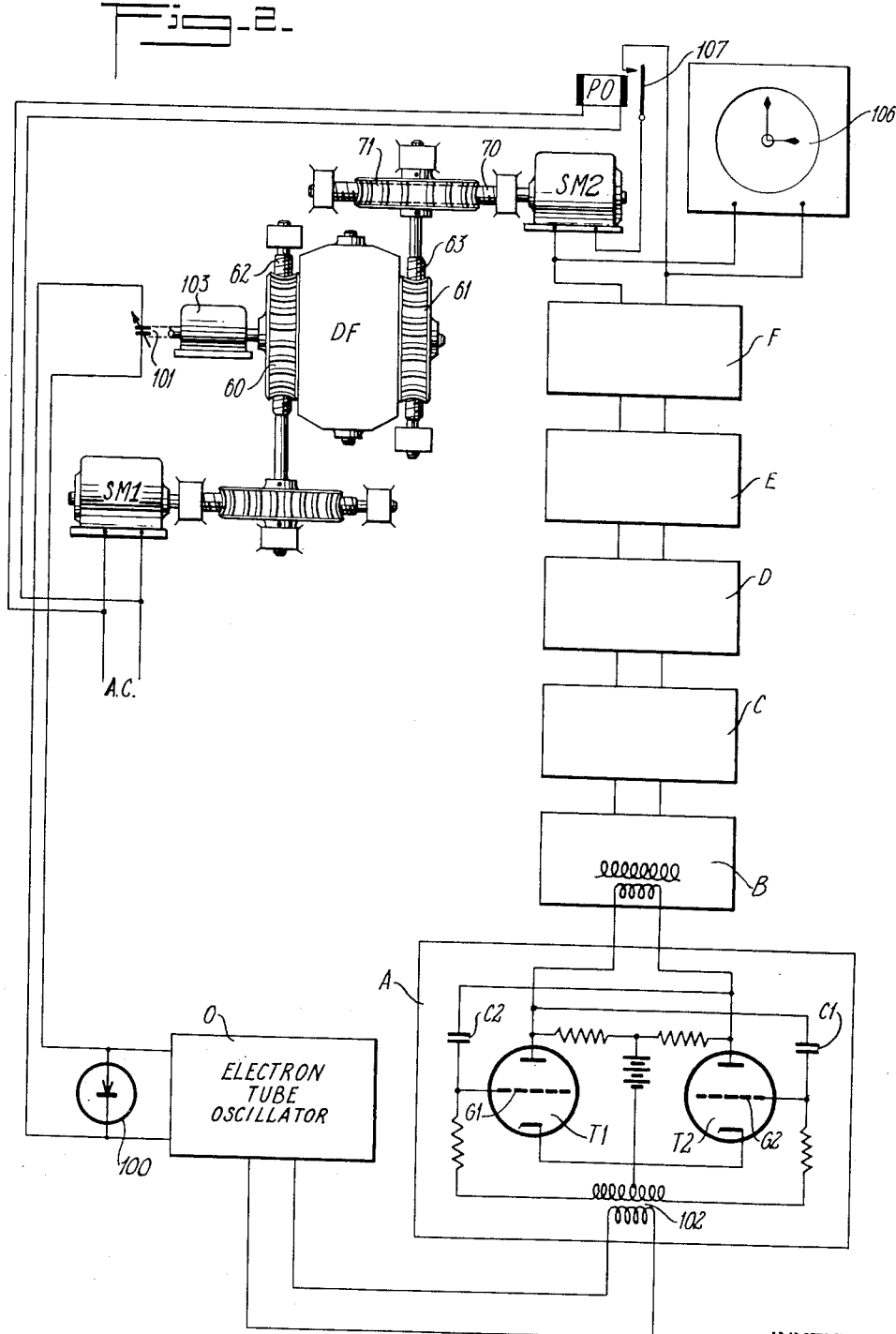
Fig. 2 is a modified form of the invention in which electronic time measuring apparatus is employed instead of the escapement mechanism shown in Fig. 1.

*Fig. 2 Structure*

In Fig. 2 has been shown a modified form of the invention. In this form of the invention, a piezo-electric crystal 100 controlled electron tube oscillator has its frequency control supplemented by a condenser 101 controlled in accordance with the average frequency of a commercial alternating current source. It is well known that a crystal controlled oscillator O may be forced slightly away from the natural frequency of the piezo-electric crystal 100 by placing a variable capacity condenser 101 in multiple therewith (see Fig. 2). Since crystals can only determine very high frequencies by their natural mechanical vibration frequencies (very high frequencies) it is necessary to beat that frequency down, so to speak. For this purpose six multivibrators, namely A, B, C, D, E and F have been shown. For a more complete description of the functioning of these multivibrators attention is directed to "Theory and Application of Electron Tubes" by Reich, 1944, sold by McGraw-Hill Book Co. Stating it briefly, the plate circuit of each tube T1 and T2 of multivibrator A acts through condenser C1 and C2, respectively, on the grid g2 and grid g1 of tube T2 and tube T1 respectively and in a direction to suppress the action of each tube. This will obviously cause the tubes to oscillate. Let us now assume that the oscillator O delivers from 925,000 to 950,000 cycles per second, depending on the adjustment of the condenser 101, and that the multivibrator A has constants so as to tend to oscillate at approximately 187,500 cycles per second. Then with the output of the oscillator O connected to the input transformer 102 of the multivibrator A, the multivibrator A will be forced to oscillate at exactly one fifth of the frequency generated by the oscillator O. If now six such multivibrators are used the output frequency of the sixth multivibrator will be approximately 60 cycles per second. This is true because $60 \times 56$ is equal to 937,500 the average between 925,000 and 950,000 cycles per second. This output is, as shown, connected to the synchronous motor SM2 through the medium of a front contact 107 of a power-off relay PO connected to the commercial A. C. source of regulated frequency. The commercial source of frequency regulated alternating current is also connected to the synchronous motor SM1. Since these two motors SM1 and SM2 drive in opposite directions the differential DF (more fully shown in Fig. 1) the condenser 101 is adjusted in accordance with the difference between the frequencies applied to these motors. The condenser 101 will thereby be adjusted to cause the output frequency of the sixth multivibrator to be exactly equal to the average frequency of the commercial frequency. The box-like structure 103 represents a train of reduction gearing connecting the ring 56 of the differential DF to the shaft of the adjustable condenser 101.

The crystal 100 and condenser 101 are preferably held at substantially constant temperature by any suitable means well known in the art and with constant temperature the frequency generated by oscillator O is extremely constant but without the addition of the adjustable feature provided through the medium of the condenser adjusted in accordance with the average frequency of the commercial alternating current source the frequency could not possibly be adjusted to the exact value necessary by the construction of the crystal 100 alone. In other words the crystal 100 provides stability of frequency and the condenser 101 provides the accuracy of frequency generated by the oscillator O. It will be observed that the synchronous motor electric clock 106 is permanently connected to the output of the multivibrator F whereas the synchronous motor SM2 is only connected so long as no commercial alternating current power cessation occurs. The gear reduction between both synchronous motors SM1 and SM2 and the differential DF is the same if like frequencies are used and the speed of operation of the condenser 101 by the ring-gear or planet-supporting wheel of the differential is preferably so slow that the tardiness of one synchronous motor over that of the other is corrected to half the extent of tardiness in say 24 or 48 hours. When a commercial power failure occurs the power-off relay PO and in turn the synchronous motor SM2 and also the synchronous motor SM1 are de-energized and the differential DF remains at rest so long as the power failure continues. Since the synchronous motor electric clock 106 keeps time continuously precisely in accordance with the average frequency of the commercial alternating current of regulated frequency it keeps perfect time.

For additional information as to the oscillator O attention is directed to page 409 of the book of Reich above mentioned and to pages 598 and 618 of "Applied Electronics E. E. staff of M. I. T." sold by John Wiley and Sons, Inc.

Although a crystal 100 has been illustrated it should be understood that this crystal may be omitted and the frequency determined wholly by the condenser 101, or other frequency determining means adjusted by the shaft 103. In this case the frequency generated may be much lower so that a smaller number of multivibrators are required to bring the frequency low enough to operate a synchronous motor. In this connection the synchronous motor SM2 need not be supplied with 60 cycle energy in that a much higher frequency may be used to operate a synchronous motor. If, for instance, the frequency generated by oscillator were as low as 240 cycles per second (the crystal 100 being omitted), this 240 cycle frequency could be applied directly to the synchronous motor SM2 in which case an additional four-to-one gear reduction would be added to the gear reduction between the differential DF and motor SM2. In this latter proposed construction no multivibrators would be required in that it is proposed that the oscillator generate alternating current of 240 cycle frequency.

*Operation Fig. 2.*—In the Fig. 2 structure the apparatus is constructed so that if the frequency of the local source applied to synchronous motor SM2 is higher than the average frequency applied to the motor SM1 the condenser 101 will be turned in a direction to lower the frequency of the current generated by the oscillator O, and vice versa. It is presumed that the gear reduction 103 between the ring 56 of differential DF and condenser 101 is so great that it takes from 24 to 48 hours to make a 50% correction of the extent the frequency generated by oscillator O differs from the correct frequency of 937,500 cycles per second, assuming the 60 cycle regulated frequency is supplied to synchronous motor SM1. It may be pointed out that the multivibrators A, B, C, D, E, and F are identical except for the fact that each has circuit constants so as to tend to generate a current having one fifth of the frequency generated by the preceding multivibrator. Since each multivibrator is dominated by the next preceding one, each one will generate a current having one fifth the frequency of the next preceding one. When the apparatus of Fig. 2 has been operated to an extent to turn condenser 101 to a position where the current applied to motor SM2 is exactly 60 cycles per second the oscillator O generates 937,500 cycles per second (which if divided by 5 six times is 60) and the clock hands 106 keep correct time. When a power failure occurs the motor SM1 stops and the power-off relay PO opens its front contact 107 to thereby stop the motor SM2, so that all automatic adjustment of the condenser 101 discontinues until power is restored. The oscillator O and multivibrators A, B, C, etc. are operated from local sources of current, not shown.

*Fig. 3 Structure*

There are time manifesting structures that do not include rotating shafts such as a simple pendulum, a balance wheel and hair spring or a vibrating reed, each with suitable means to maintain them operating. In these cases a contact closed at the end of definite time periods may be and is presumably present. In accordance with the form of invention shown in Fig. 3 it is proposed to sub-sychronize the intermittent closing of such a contact with the average frequency of a commercial alternating current which has been regulated so that its average frequency correctly manifests the passing of time.

Referring to Fig. 3 the pendulum 215 is supported in the same manner as is the pendulum 22 of Fig. 1 and its effective length is adjusted by the worm-wheel 225 driven by the worm 226 in the same way as do worm-wheel 25 and worm 26 regulate the pendulum 22. This pendulum 215 may be kept running by any suitable means, as for instance by door-bell action. Most wrist watches employ a balance wheel having a period of one fifth second. If therefore the pendulum 215 has an effective length so as to beat approximately one fifth seconds and its length is then automatically adjusted in accordance with the present invention so as to beat exactly one fifth seconds, as is proposed, then a stroboscope lamp may be controlled by such pendulum for the purpose of synchronizing the balance wheel of wrist watches with the flashes of light emitted by the stroboscope lamp. A grid controlled stroboscope lamp SL controlled by contact 227 operated by the pendulum 215 is shown in Fig. 3.

Let us first consider the operating characteristics and also the structure of the 2-phase synchronous motor SM4. This synchronous motor, shown specifically in Figs. 3a and 3b if the two phases thereof are properly controlled, may be used as a step-by-step motor. This 2-phase synchronous motor SM4 includes two ring coils or windings PA and PB which may also be called phases and which surround the shaft 239 and are concentric therewith. Each of these ring coils is contained in a U-shaped ring of magnetic material having staggered teeth bent toward each other in a manner to bring the ends of these teeth into the same plane at right angle to this shaft 239. These U-shaped rings have been designated 229 and 230 and support coils PA and PB respectively. The teeth of U-shaped ring 229 have been designated 231, 232, 233, 234, 235, 236, 237 and 238. If the coil PA is energized by direct current of one polarity all the even numbered poles or teeth emit magnetism of one polarity and all odd numbered poles or teeth emit a magnetic field of the opposite polarity. In the plane of these teeth 231–238 is contained a disk rotor 240 of permanent magnet material supported for rotation by the shaft 239. This rotor 240 is provided with projecting poles or teeth 241, 242, 243, 244, 245, 246, 247 and 248, which are so permanently magnetized that all of the odd numbered poles or teeth are north poles N and all even numbered poles are south poles S. The phase PB of this motor SM4 is provided with a similar rotor 250 (see Fig. 3b) having permanently magnetized teeth 251, 252, 253, 254, 255, 256, 257 and 258 of which all the odd numbered teeth are north poles and all even numbered teeth are south poles. The stator teeth of magnetic ring 230 cannot be seen in the showing of the motor SM4 in Fig. 3a of the drawings because they are hidden behind teeth 231–238, but four of these teeth, namely, 261, 265, 266 and 268 are shown in cross section in Fig. 3b of the drawings. It is readily seen that the rotors 240 and 250 are held at rest in the position shown by the magnetic action of the teeth of rotor 240. When the rotor stands at rest displaced one-half tooth pitch from the position shown and with both coils de-energized the rotor will be held at rest by the magnetism emitted by the permanent magnet poles 251—258. If now current is applied to phase PA and it is of a polarity to make teeth 231, 233, 235 and 237 south poles the rotor will remain in its illustrated position. If, on the other hand, the phase PB is energized by direct current of a polarity to emit a south pole magnetic field from teeth 261 and 265 (see Fig. 3b) the rotor 250 will have its teeth 251 and 255 (see Fig. 3a) respectively attracted thereto, to cause the rotor 250 to be rotated counter-clockwise, as viewed in Fig. 3a of the drawings, to an extent of one half tooth pitch, or twenty two and one-half degrees. Had the current been of opposite polarity the teeth 254 and 258 would have been attracted and the rotor would have been rotated in a clockwise direction through an arc of one half tooth pitch. From these considerations it is readily seen that if two-phase alternating current is applied to the winding PA and PB the rotor will operate at synchronous speed and in a direction depending on which of the two coils PA and PB is energized by the lagging current. If the coil PB is supplied with the lagging current the rotor will run counter-clockwise and if the current supplied to coil PA lags the current supplied to coil PB the rotor will operate clockwise. This motor will obviously be self-starting if the frequency of the current applied thereto is low enough as compared with the inertia of the rotor, in that synchronous speed must be reached during one half cycle lapse of time. This synchronous motor SM4 will be self-starting for frequencies as high as sixty cycles per second.

In the Fig. 3 structure, as above pointed out, the contact 216 is assumed to close every one fifth of a second when the pendulum is correctly adjusted. The synchronous motor SM3 which may be of any suitable self-starting construction is energized from a source of regulated commercial alternating current and is provided with self contained reduction gearing to preferably make the shaft 218 operate at 5 R. P. S. (revolutions per second). This shaft 218 is provided with two slip rings 207 and 208 which contain brushes 205 and 206 secured thereto and rotating therewith and are engaged by stationary brushes 209 and 210 respectively. A stationary commutator consists of four sectors 201, 202, 203 and 204 surrounding and being engaged by brushes 205 and 206. Each of these sectors spans substantially 90 degrees and the brushes 205 and 206 are displaced substantially 180 degrees apart. From this construction it is readily seen that if the contact 216 is closed at intervals of exactly one fifth of a second and the shaft 218 rotates exactly five revolutions per second that the same coil PA or PB is closed in a circuit with the battery BB in the same polarity direction intermittently, which has no effect on the rotor. If, however, the shaft gains with respect to intermittent closure of the contact 216 the contact brushes 205 and 206 will eventually have reached segments 203 and 201 respectively (assuming clockwise rotation of shaft 218) instead of segments 202 and 204 respectively, as a result of which current is shifted from the coil PB to coil PA of the motor SM4. This will, for reasons above given, cause the rotors 240 and 250 to be rotated in a counterclockwise direction to an extent of one-half pole pitch. This is true because there is not only a shift from coil PB to coil PA but also the relative polarity direction of the two coils has been reversed. It is readily seen that if the synchronous motor SM3 is slow as compared with the pendulum 215 the rotating brush 205 finally will be still on segment 201 when the contact 216 closes and in this event the synchronous motor SM4 will operate clockwise a one half tooth pitch distance and thereby lengthen the pendulum 215 to a slight extent. In other words, the motor SM4 is rotated in accordance with the difference of time manifestation of pendulum 215 and the synchronous motor SM3 and since the gear reduction between synchronous motor SM4 and worm 225 conventionally shown by the gear-box 217 is such as to make a half correction over a period of from 24 to 48 hours the pendulum 215 will eventually, say in 240 hours, be adjusted to keep time in accordance with the average frequency of the commercial alternating current frequency, which is so regulated that its average frequency correctly manifests the passing of time. The combination of the commutator 200 and the synchronous motor SM4 therefore constitute an electromagnetic differential.

From the foregoing it is understood that the contact 227 is closed periodically at one-fifth second intervals. The grid controlled stroboscope tube SL includes a heater $h$, a grid $g$ and a plate $p$ contained in a gas-filled sealed envelope. When the contact 227 is open and the tube SL is not conducting the condenser CO is charged from plate battery PB through the resistance unit R. The moment the contact 227 is closed the grid is made positive and the lamp SL is caused to conduct current and flash a very bright flash of light. As the condenser CO becomes discharged the lamp is extinguished and before the condenser CO takes on any appreciable charge the contact 227 is opened. These flashes of light may then be caused to shine on the balance wheel of a watch and the watch hair spring may then be adjusted until the balance wheel appears to be standing still. When this has been accomplished the watch keeps perfect time until some factor of the watch itself disturbs such accurate time keeping quality. If a contact were closed by a synchronous motor at the end of each 720 cycles of regulated commercial 60 cycle current for the purpose of controlling a stroboscope lamp the error from accurate time measuring could be as much as one per cent which is too inaccurate for balance wheel stroboscope watch adjustment.

*Operation Fig. 3.*—Let us assume that when the apparatus of Fig. 3 was either installed on a test bench or on a purchaser's premises, and the pendulum 215 happened to be adjusted so that the frequency thereof was 1% high and let us further assume that the frequency of the 60 cycle regulated commercial alternating current was, for a short time, 1% high. Although commercial current may be regulated, it is regulated only as to average frequency and not as to instantaneous frequency. Under the assumed conditions the brushes 205 and 206 will assume exactly the same position each time the contact 216 is closed and the synchronous motor SM4 will remain stationary because only one of the phases PA or PB of this motor will have repeated impulses of the same polarity applied thereto. Let us now assume that commercial frequency is exactly correct (60~). Since motor SM3 drives the brushes 205 and 206 in a clockwise direction at exactly 5 R. P. S. the pulses created by contact 216 come each revolution just a little before the revolution has been completed by the brushes 205 and 206, because the clock is adjusted 1% fast, and finally they will be in contact with segments 201 and 203 when the impulse arrives and phase PA instead of phase PB of motor SM4 will be energized. This will cause the motor SM4 to be operated to an extent of ½ tooth pitch and in a direction to lengthen pendulum 215. In this connection it may be pointed out that synchronous motor SM4 can be energized through these two coils PA and PB four different ways, namely, each coil in two different polarity directions, and these four ways of energizing of the motor SM4, when occurring in the proper order will cause this motor to take four ½ tooth pitch steps in the same direction, assuming of course that the relative speeds of the impulses from battery BB and of synchronous motor SM3 remain the same, and this same direction is such as to bring the pendulum action in conformity with the average frequency. As averaging of frequency of the commercial 60 cycle source continues the effective length of the pendulum will eventually be adjusted to keep exactly correct time and this adjustment will be only very slightly disturbed during temporary slight variations of the frequency of the commercial source. When a power failure occurs the motor SM3 stops as does also the rotation of brushes 205 and 206. The repeated impulses applied to the motor SM4 produce no effect. Also if such pulses are not desired during a current cessation the source BB may be replaced by rectified current derived from the commercial alternating current source so that the direct current flow is also discontinued during a current cessation. Here too, it is proposed that the gear ratio of train 217 be such that a half correction is made in 24 or 48 hours.

*Resume.*—The invention herein disclosed does not provide structure whereby an escapement clock or any other form of mechanical or electronic time manifesting means is caused to be adjusted to follow the variations in the frequency of a commercial alternating current but instead provides apparatus to cause such time manifesting means to be adjusted very slowly to the average frequency of such commercial alternating current. By the structure of the present invention small time periods may be accurately measured anywhere where commercial alternating current of regulated frequency is distributed, this accurate time measuring is determined by star observation at the Naval Observatory at Washington, D. C. through the medium of time signals and average frequency regulation of commercial alternating current power systems.

Having thus shown and described several embodiments of the present invention, it is desired to be understood that the forms illustrated and described do not exhaust all possible constructions that may be resorted to for the purpose of carrying out the invention and that the forms shown are merely examples of forms the invention may take and it should be understood that various changes, modifications and additions may be made in adapting the invention to the particular problem encountered in practicing the invention so long as these changes do not depart from the spirit or scope of the present invention as defined by the scope of the following claims.

What I claim as new is:

1. Time measuring apparatus comprising, a source of commercial alternating current of varying frequency having its frequency regulated to generate substantially a fixed number of cycles of alternating current in each twenty-four hour period so as to substantially correctly manifest a tweny-four hour period of time but incapable of measuring accurately a short period of time, an oscillatory device for accurately measuring either a short period or a long twenty-four hour time period if properly adjusted, period changing means, adjustable means which if operated adjusts said period changing means to change the period of oscillation of said oscillatory device, and means responsive to the ratio of the frequency of said alternating current and the frequency of operation of said oscillatory device for operating said adjustable means and functioning so slowly that after a period of days it will fix the period of said oscillatory device to a value where a fixed and predetermined ratio between the frequency of operation of said oscillatory device and the average frequency of said alternating current over a twenty-four hour period exists, said predetermined ratio being such as to cause said oscillatory device to be properly adjusted to accurately measure the passing of time as determined by the average frequency of said source.

2. Time indicating apparatus comprising, a time shaft, means for driving said time shaft at a predetermined accurate speed and including adjustable means for determining such predetermined accurate speed of operation, a source of alternating current of varying frequency having its frequency regulated to manifest by its average frequency the correct passing of time, a synchronous motor operated by alternating current from said source, and operating means operated jointly by said time shaft and said synchronous motor for operating said adjustable means and which operates in a direction to integrate the difference of the speeds of operation of said synchronous motor and said time shaft and which operates so slowly relative to said difference of speeds that after a period of days said adjustable means is operated to a position to cause said time shaft to operate continuously at such predetermined accurate speed at which it accurately manifests the correct passing of time as determined by the average frequency of said alternating current during such period of days.

3. Time indicating apparatus comprising, a time shaft, means for driving said time shaft at a predetermined accurate speed and including adjustable means for determining a particular predetermined accurate speed of operation, translating means operated by said time shaft, a source of alternating current of varying frequency having its frequency regulated so that its average frequency correctly manifests the passing of time, a synchronous motor operated from said alternating current source, and control means operated jointly by said translating means and said synchronous motor and operating to integrate the difference of the speeds of said synchronous motor and said time shaft and in a direction dependent on which of the two speeds is the higher and so slowly relative to the difference of the two speeds that it will only after a period of days following wrong adjustment of said adjustable means cause operation of said adjustable means to a condition to cause said time shaft to operate continuously at a speed to substantially manifest the passing of time the same as would be manifested by an alternating current of a constant frequency equal to said average frequency.

4. Time measuring apparatus as defined in claim 1, and a stroboscope lamp controlled by the oscillatory device.

5. Time measuring apparatus as defined in claim 1 wherein the means responsive to the ratio of the frequency of the commercial alternating current and the frequency of operation of the oscillatory device for operating the adjustable means comprises a commutator driven by the synchronous motor energized from said source of commercial alternating current, and a multiphase synchronous alternating current motor for adjusting the adjustable means and energized by pulses of current depending for their frequency on the frequency of operation of said oscillatory device and which pulses are applied to the proper phases of said multiphase synchronous motor by said commutator to cause said multiphase synchronous motor to rotate at a speed and in a direction in accordance with said ratio and to in turn operate said adjustable means to establish the predetermined ratio specified in claim 1.

6. Time measuring apparatus as defined in claim 1, wherein the oscillatory device includes a pendulum operated contact for generating periodic current pulses, wherein the means responsive to the ratio of the frequency of said alternating current and the frequency of operation of the oscillatory device comprises a commutator driven by a synchronous motor energized by alternating current from said source of alternating current and a multiphase synchronous motor for adjusting the adjustable means and energized by current pulses generated by said pendulum operated contact and which pulses are applied to the proper phases of said multiphase synchronous motor by said commutator to cause said multiphase synchronous motor to rotate at a speed and in a direction in accordance with said ratio and to in turn operate the adjustable means of claim 1 to establish the predetermined ratio specified in claim 1.

7. Time measuring apparatus as defined in claim 1, wherein the oscillatory device for measuring either a short or a long twenty-four hour period of time comprises an electron tube oscillator having characteristics to generate a constant frequency alternating current, wherein the adjustable means of claim 1 is an adjustable means associated with said electron tube oscillator which may be operated to determine the particular frequency to be generated by said electron tube oscillator, and wherein the means responsive to the ratio of the frequency of said alternating current source and the frequency of the oscillatory device comprises means controlled jointly by the current generated by said electron tube oscillator and the alternating current from said source and which means operates the adjustable means associated with said electron tube oscillator and which operates said adjustable means so slowly that after a time the frequency of the current generated by said electron tube oscillator has a predetermined ratio to the average frequency of the alternating current supplied by said alternating current source.

8. Time measuring apparatus as defined in claim 1, wherein the oscillatory device generates current pulses and wherein the means responsive to the ratio of the frequency of the alternating current source mentioned in claim 1 and the frequency of the current pulses generated by the oscillatory device comprises electromagnetic differential means for operating the adjustable means and which is constructed to operate said adjustable means in a direction and to an extent dependent on the ratio of the frequency of the alternating current generated by said source and the frequency of the current pulses generated by said oscillatory device and which is ineffective to operate said adjustable means in the event there is a cessation of either the alternating current or the current pulses generated by the oscillatory device, and wherein the adjustable means is operated until a substantially fixed and predetermined ratio between the average frequency of said alternating current and the frequency of such current pulses generated by said oscillatory device exists.

9. Time measuring apparatus as defined in claim 1, wherein the oscillatory device for measuring either a long or a short period of time includes a time shaft, wherein an alternating current synchronous motor is operated by the alternating current of varying frequency, and wherein the means responsive to the ratio of the frequency of the varying frequency alternating current and the frequency of operation of said oscillatory device of claim 1 comprises a mechanical differential operated jointly by said time shaft and by said synchronous motor and which operates the adjustable means of claim 1 to cause it to be adjusted to cause said time shaft to be operated to accurately manifest the passing of time over short periods as well as long periods as determined by the average frequency of said alternating current source over a long period of time.

10. Time measuring apparatus as defined in claim 1, wherein the oscillatory device for accurately measuring either a short time period or a long twenty-four hour time period comprises an electron tube oscillator, wherein the period changing means comprises an adjustable condenser for determining the frequency of the current generated by the electron tube oscillator, wherein the adjustable means for operating the period changing means comprises the output shaft of a gear reduction structure, and wherein the means responsive to the ratio of the frequency of said alternating current source and the frequency of said oscillatory device of claim 1 comprises differential gearing having one input shaft driven by a synchronous motor energized by alternating current from said source of varying frequency alternating current and having another input shaft driven by a synchronous motor energized by current generated by said electron tube oscillator and having an output shaft operatively connected to an input shaft of said gear reduction structure.

References Cited in the file of this patent

UNITED STATES PATENTS 1,328,247   Poole _____ Jan. 13, 1920